United States Patent
Yee et al.

(10) Patent No.: US 7,761,340 B2
(45) Date of Patent: Jul. 20, 2010

(54) REAL-TIME FEDERATED AUCTIONS AND PURCHASING

(76) Inventors: Dawson Yee, c/o Microsoft Corporation, Attn: [x 52850] One Microsoft Way, Redmond, WA (US) 98052; Ruston John David Panabaker, c/o Microsoft Corporation, Attn: [x 34161] One Microsoft Way, Redmond, WA (US) 98052; Eric Horvitz, c/o Microsoft Corporatoin Attn: [x 62127] One Microsoft Way, Redmond, WA (US) 98052; William Jefferson Westerinen, c/o Microsoft Corporation, Attn: [x 52681] One Microsoft Way, Redmond, WA (US) 98052

( * ) Notice: Subject to any disclaimer, the term of this patent is extended or adjusted under 35 U.S.C. 154(b) by 854 days.

(21) Appl. No.: 11/557,074

(22) Filed: Nov. 6, 2006

(65) Prior Publication Data

US 2008/0109301 A1    May 8, 2008

(51) Int. Cl.
*G06Q 30/00* (2006.01)
*G06Q 40/00* (2006.01)
(52) U.S. Cl. ......................................... 705/26; 705/37
(58) Field of Classification Search .................... 705/26, 705/37
See application file for complete search history.

(56) References Cited

U.S. PATENT DOCUMENTS

| | | | |
|---|---|---|---|
| 6,101,484 A * | 8/2000 | Halbert et al. ................. 705/26 |
| 7,200,566 B1 * | 4/2007 | Moore et al. .................. 705/26 |
| 7,630,921 B2 * | 12/2009 | Deas et al. ..................... 705/26 |
| 2002/0032631 A1 * | 3/2002 | Rose ........................... 705/37 |
| 2003/0007464 A1 | 1/2003 | Balani | |
| 2004/0138986 A1 | 7/2004 | Petrovich | |
| 2005/0125331 A1 | 6/2005 | Dinwoodie | |
| 2005/0125333 A1 | 6/2005 | Giannetti | |
| 2005/0246235 A1 | 11/2005 | Wilczynski et al. | |
| 2006/0122850 A1 | 6/2006 | Ward et al. | |
| 2006/0167785 A1 | 7/2006 | Mullany et al. | |
| 2006/0167790 A1 | 7/2006 | Gould et al. | |

(Continued)

FOREIGN PATENT DOCUMENTS

EP    1 041 502 A2    10/2000

(Continued)

OTHER PUBLICATIONS

Thane Peterson, "The Art of the Auction," Business Week (Online), New York, Nov. 18, 2003, p. 1.*

(Continued)

*Primary Examiner*—Charles R Kyle
*Assistant Examiner*—David L Wood
(74) *Attorney, Agent, or Firm*—Collins & Collins Incorporated; L. Alan Collins

(57) ABSTRACT

A method and system is provided for conducting a purchasing activity among federated devices in an ad hoc network. In one example, the purchasing activity is an auction. Devices may be identified for federating into the ad hoc network. The devices may be identified, for example, based on distance from an auction item or distance from a device of a seller of the auction item. Alternatively, the purchasing activity may include a bulk purchase in which user devices may federate into an ad hoc network for sharing costs of bulk items.

10 Claims, 9 Drawing Sheets

U.S. PATENT DOCUMENTS

2007/0060358 A1* 3/2007 Amaitis et al. .............. 463/42
2007/0244750 A1* 10/2007 Grannan et al. ............. 705/14

FOREIGN PATENT DOCUMENTS

| EP | 1 202 203 A2 | 5/2002 |
|---|---|---|
| WO | WO 00/22907 A2 | 4/2000 |
| WO | WO 2004/003810 | 1/2004 |

OTHER PUBLICATIONS

Paris Perfect, Sep. 8, 2006, retrieved from http://web.archive.org/web/20061023013203/www.parisperfect.com/paris-flea-markets/text/paris-flea-markets.html.*

Matthias Wagner et al. "An XML-Based Multimedia Middleware for Mobile Online Auctions", Universität Augsburg Technical Report, Institute of Computer Science, University of Augsburg, Jan. 2001.

Mauro Caporusco et al. "Design and Evaluation of a Support Service for Mobile, Wireless Publish/Subscribe Applications", IEEE Transactions on Software Engineering, Dec. 2003, vol. 29, No. 12.

Hannes Frey et al. "UbiBay: An action system for mobile multihop ad-hoc networks", Workshop on Ad hoc Communications and Collaboration in Ubiquitous Computing Environments (AdHoc-CCUCE'02), 2002.

* cited by examiner

REAL-TIME FEDERATED AUCTIONS AND PURCHASING

BACKGROUND

Electronic auctions have become increasingly popular. Typically, a computer user may access an electronic auction site and browse for items that may be of interest. When the user finds an item of interest, the user may place a bid on the item. At the same time other users may also be interested in placing bids on the same item. In this scenario, an auction may ensue in which multiple users may bid against each other for the same desired item.

In the typical electronic auction, the individual users connect to the auction site via a network connection, i.e., the Internet. The auction site may display various items for sale such that any of the users, after connecting to the auction site via the internet, may determine which items are desired. After a user determines which item is desired, the user may place a bid on the selected item in an attempt to purchase the item.

However, if a user is not connected to the internet, the user may not participate in the auction. For example, if a user does not subscribe with an Internet Service Provider (ISP), the user would be unable to connect to the network (Internet) and would therefore be unable to access the auction website. In this way, the user would be unable to browse the available inventory on the auction web site and would also be unable to participate in the auction.

Also, a user would have to identify a desired item for purchasing prior to bidding on the item. If the user is unable to identify the item on the website, he/she would also be unable to bid on the item. For example, the user may browse the auction website but may not readily find any items to purchase. However, certain items that are of interest to the user may be present on the auction website even though the user is unable to identify the items. This may be a result of a variety of causes. For example, the user may be using search terms that are different from the auction website. Also, the user may be searching for particular items but may not be actively searching for other items that may also be of interest to the user. In this case, the user would be unable to participate in an auction for items that would have been of interest.

SUMMARY

A method is provided for conducting a purchasing activity in which one or more devices federate into an ad hoc wireless network. The federated devices may exchange messages for conducting the purchasing activity.

The method may further include determining participant devices in the purchasing activity. For example, devices may be federated into the ad hoc wireless network if the devices are within a predetermined distance of either the item being sold, a user device initiating the purchasing activity, or a host device such as a server or hub.

The purchasing activity may be an auction. The messages exchanged among the federated devices may include information relevant to the auction. For example, the exchanged messages may include bids placed (i.e., amounts), other bidder's offers, status of the auction or auction item(s), etc.

In another example, the purchasing activity may be a bulk sale. Participating devices may share in the purchase of bulk items and/or costs of the bulk items. The participating devices may coordinate the bulk sale activities via exchanged messages via the ad hoc wireless network of the federated devices.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DESCRIPTION

A method and system for federating user devices in an ad hoc network is described herein. Such devices may be referred to as federated devices. Federated devices may include any user devices that are organized into a network. Such devices include mobile devices such as PDAs, cell phones, laptop computers, portable computing devices, etc. As described herein, any such user device may be included in an ad hoc network for participation in a purchasing activity, such as an auction.

Figure 1:
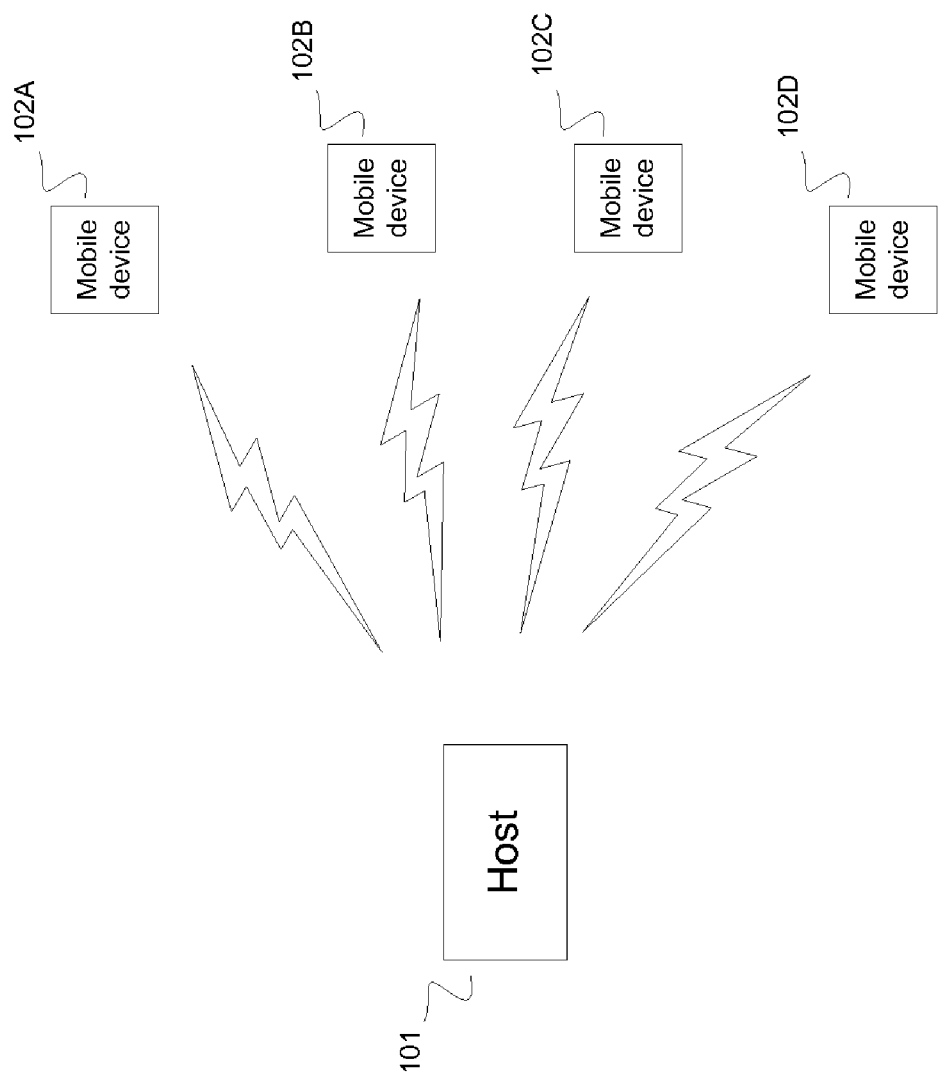
FIG. 1 is a partial block diagram illustrating an example of federated devices in communication with a central host device.

FIG. 1 is a partial block diagram illustrating an example of federated devices in communication with a central host device. In this example, mobile devices (102A, 102B, 102C, and/or 102D) are individual mobile devices that are federated devices in that the mobile devices (102A, 102B, 102C, and 102D) are organized and connected into an ad hoc network. As one example of organizing federated devices, mobile device 102A may be a portable computing device being carried by User A. User A may enter an area or zone in which federated devices are participating in a purchasing activity via an ad hoc network. When User A enters the area with mobile device 102A, mobile device 102A may become incorporated into the ad hoc network so that User A may also participate in the purchasing activity. In one example, the purchasing activity is an auction.

In the example illustrated in FIG. 1, a host device 101 may be included in the network. The host device 101 may be any device capable of participating in the purchasing activity (e.g., an auction). For example, the host device 101 may be a server or hub for receiving and processing information/data from any of the participating mobile devices (102A, 102B, 102C, or 102D, in this example). The host device 101 may also be a device of an individual selling the item (or service) being auctioned. In this example, each of the participating mobile devices (102A, 102B, 102C, or 102D) may submit bids to the host device 101. Also, any of the bids of any of the mobile devices may be observed at any of the mobile devices. Alternatively, bids may be kept confidential such that bids placed by each of the mobile devices to the host device 101 may be kept confidential and may not be shared with other mobile devices.

Figure 2:
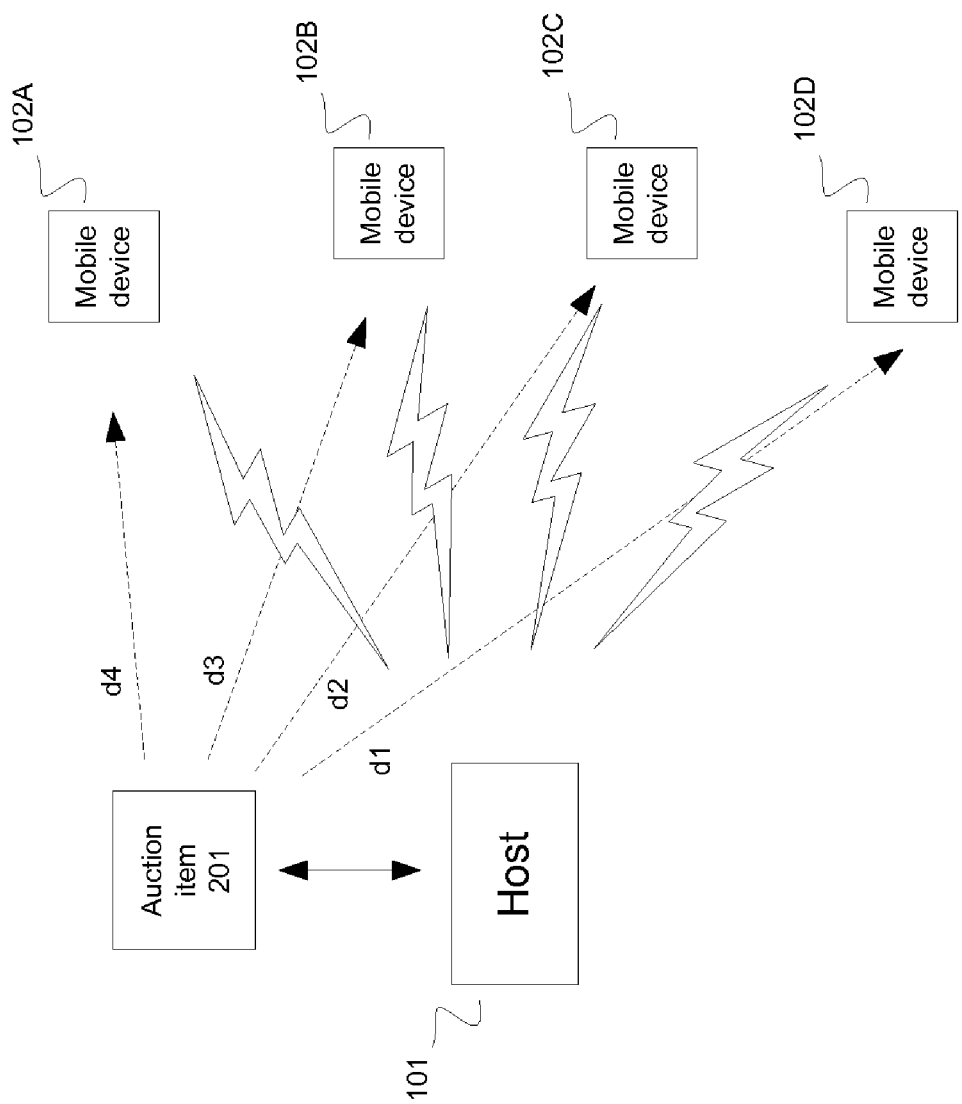
FIG. 2 is a partial block diagram illustrating an example in which mobile devices participate in or join an ad hoc network based on location.

FIG. 2 is a partial block diagram illustrating another example in which mobile devices may participate in or join an ad hoc network (e.g., for an auction) based on location. As illustrated in this example, mobile devices within a predetermined distance from an item being auctioned may be informed of the auction. Each respective user of the mobile devices may decide if participation in the auction is desired. If a user wishes to participate in the auction, the user may transmit a signal or message to a host device 101 to indicate that participation is desired. As additional users also indicate interest in the auction, each of the devices federate to form an ad hoc network.

As FIG. 2 illustrates, each of the mobile devices (102A, 102B, 102C, and 102D) is within a predetermined distance of the auction item 201. Mobile device 102A is a distance d4 from the auction item 201, Mobile device 102B is a distance d3 from the auction item 201, Mobile device 102C is a distance d2 from the auction item, and Mobile device 102D is a distance d1 from the auction item 201. Distance d1 is the farthest distance from the auction item 201 but, in this example, is within a predetermined distance from the auction item 201 in which participation in the auction may be accomplished. Conversely, if a mobile device is farther away from the auction item than the predetermined distance, that mobile device may not be informed of the auction or may not participate in the auction unless the mobile device moves within range of the auction item.

Hence, each of the mobile devices (102A, 102B, 102C, and 102D) may participate in the auction for auction item 201. Also, host device 101 may coordinate the auction of auction item 201 among the mobile devices (102A, 102B, 102C, and 102D). For example, host device 101 may determine the distance between the auction item 201 and each of the mobile devices (102A, 102B, 102C, and 102D). The host device 101 may compare the distances of each of the mobile devices to the auction item and, if it is determined that each of the mobile devices (102A, 102B, 102C, and 102D) is within a predetermined distance of the auction item 201, the host device 101 transmits a message to each of the mobile devices (102A, 102B, 102C, and 102D) to announce the auction of the auction item 201. A message is not sent to non-participating mobile devices. Each user of the respective participating mobile devices (102A, 102B, 102C, and 102D) may return a confirmation message that participation in the auction is desired and the auction may proceed.

To ensure adequate participation in the auction, the host device 101 may not transmit a message announcing the auction until a certain predetermined number of mobile devices are within range of the auction item 201. The predetermined number of mobile devices may be selected as any desired number (e.g., 2, 3, 5, 6, 7, 10, 12, 15, 20, 25, 50, 100, etc.). If fewer than the predetermined number of mobile devices are present within the predetermined distance of the auction item 201, an auction is not announced to the mobile devices. Once the minimum number of mobile devices is determined to be in range of the auction item 201, the host device sends the announcement of the auction of the auction item 201 to each of the mobile devices.

In another example, at least a minimum predetermined number of mobile devices are detected within range of the auction item 201 and the host device 101 sends a message announcing an auction for auction item 201 to each of the mobile devices within range. If fewer than a certain predetermined number of responding mobile devices is present, the auction of auction item 201 may be cancelled. For example, if the predetermined number of mobile devices within range of the auction item 201 is ten and eleven mobile devices are within range of the auction item 201, the host device 101 may transmit a message to the eleven mobile devices to announce a potential auction and request confirmation of participation from each of the eleven mobile devices. If the minimum number of participating mobile devices is five and only four mobile devices (of the eleven) respond to participate in the auction, the auction may be canceled because fewer than the predetermined number of responding mobile devices is received.

In another example, a user may identify an item for sale in which the user wishes to participate in an auction for the sale item. The auction may be ongoing or may have yet to form. The user may transmit a request message to initiate an auction. In one example, the user transmits the request message to a host device such as a server or a hub. The host device receives the request message and, responsive to receiving the request message, creates an auction by transmitting a radio request to one or more devices to join the auction as described herein. Alternatively, if an auction is in progress or ongoing, the user may join the auction by transmitting the request message to join the auction to the host device. Responsive to the request message, the user's device is federated into the ad hoc network and the user joins the auction.

The auction item 201 may not be present during the auction such that notification and participation of the mobile devices may be based on factors other than distance from the auction item 201. For example, the auction item 201 may be a service rather than a tangible item or may be a tangible item that is not physically located at the auction site. Also, the auction may be conducted over a dispersed area such that distances may not be conveniently measured between each of the potential participants and the auction item. When the auction item is either not present, intangible (e.g., a service), or otherwise not measurable, an auction may be performed among federated devices responsive to a user's desire to conduct an auction for any item or service. The user may initiate the auction by transmitting a message to announce the auction of the auction item. Other devices expressing an interest in participating in the auction may federate with the initiating device and the auction may proceed among the participating devices.

An auction may be initiated by a host device or user device by transmitting an advertisement to one or more devices. Users may be unaware that an auction item exists or that an item is up for sale. A host device or a seller of the auction item may transmit a radio request to one or more devices (e.g., devices within a geographic region, devices within a certain predetermined distance of the seller or the auction item, devices associated with users that satisfy a certain demographic, etc) to join an auction. The transmitted request may include an advertisement that advertises the availability for sale of the auction item (or service). Users of the one or more devices who may have an interest in purchasing the advertised auction item or service may join the ad hoc network for participating in the auction for the item or service. Thus, the transmitted radio request may inform other users of the availability of an item/service for sale by transmission of an advertisement.

A user may initiate an auction. The user may identify a desired item on display and may wish to purchase the item. The item may be an auction item in which an auction has not yet been initiated. The user may initiate the auction with other users in the vicinity of the item or users within a certain distance of the user initiating the auction. One example of such an auction includes an auction of an item in a retail store. A user or customer may identify a desired item in a retail store and may use a mobile device (or a similar device provided by the retail store) to initiate the auction. The user transmits a message to a host device via the mobile device (e.g., a cell phone, PDA, laptop computer, etc.) which may result in the transmission of an announcement to other mobile devices within a predetermined distance of the item for auction that an auction is being initiated for the item. Alternatively, the user may transmit an announcement message to all devices within a predetermined distance of the user to initiate an auction. Each user within range of the user initiating the auction interested in participating in the auction may transmit a response to the user initiating the auction to inform the user initiating the auction of the desire to participate in the auction.

Thus, each participating mobile device federates to create an ad hoc network for conducting the auction. Each user of each of the participating federated mobile devices may submit bids and may also receive information of the actions of other bidders, status of the auction item, status of the auction, etc. Hence, each of the users may be fully informed of other offers or any other information relevant to the auction. Alternatively, selected information may be blocked from any number of participating mobile devices, if desired.

Figure 3:
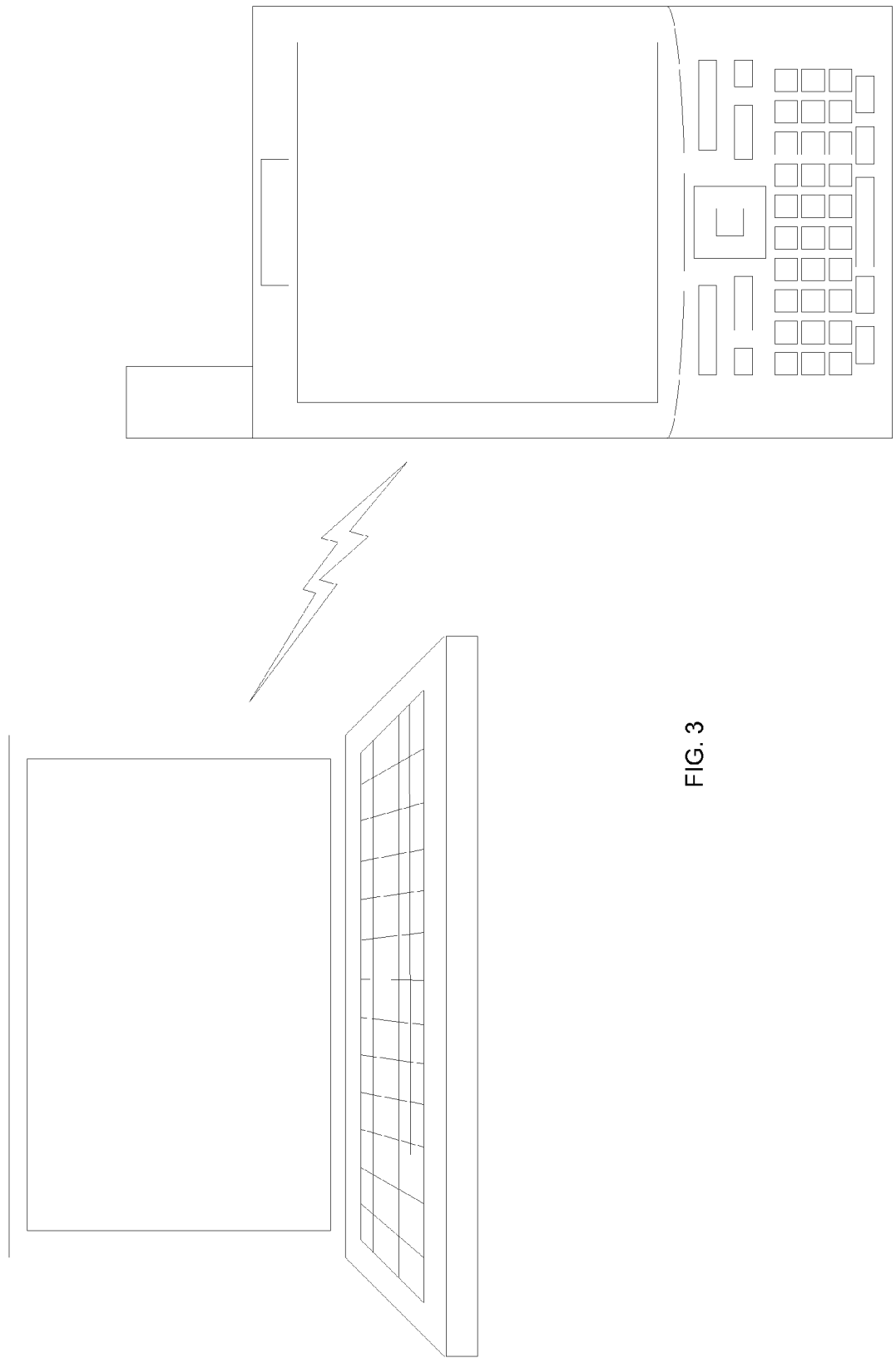
FIG. 3 illustrates an example of federation of a mobile device.

FIG. 3 illustrates an example of federation of a mobile device. In this example, a handheld wireless device 301 communicates with a laptop computer 302. A user of the handheld wireless device 301 may transmit a message via the handheld wireless device 301 to the laptop computer 302. The laptop computer 302 receives the message from the handheld wireless device 301 and processes the message for creating an auction in which the user may place a bid for an auction item. In this example, the laptop computer 302 is a host device that coordinates the auction among participating devices (e.g., handheld wireless device 301). FIG. 3 shows one representative device for participating in an auction, however, any number of devices and any type of device may also be federated into the network. For example, a PDA, cell phone, or laptop computer may also be federated into the network. FIG. 3 also illustrates the host device 302 as a laptop computer, however, any device may be used as the host device 302 including, but not limited to, a wireless handheld device, a PDA, or cellular telephone, to name a few.

Figure 4:
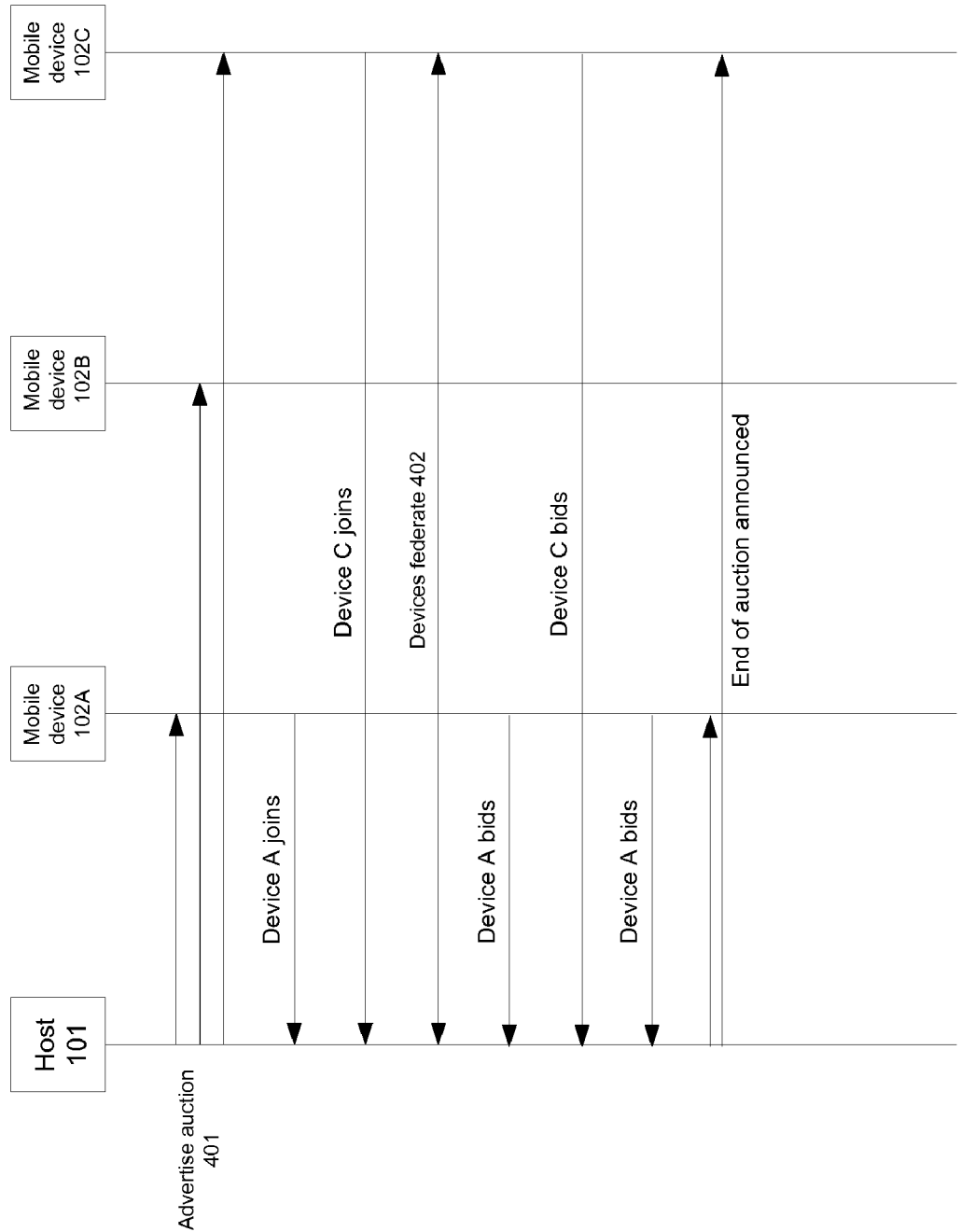
FIG. 4 is a diagram illustrating in example of a method of federating devices in an ad hoc network and establishing an auction among the federated devices.

FIG. 4 is a diagram illustrating in example of a method of federating devices in an ad hoc network and establishing an auction among the federated devices. In this example, a host device (e.g., a server or hub) advertises an auction for an auction item 401. The host device 101 may transmit a message to each mobile device (102A, 102B, 102C) within range of the auction item as described above. Also, the host device 101 may determine that a minimum number of devices is within range of the auction item prior to transmitting the message announcing the auction. Alternatively, the host device 101 may transmit a message containing an invitation to join an activity (e.g., an auction) to a mobile device that is outside of the range of the auction item or other desired reference point. In this example, when the user of the mobile device outside of the range of the auction receives the invitation message to join the auction, the user may confirm the desire to participate in the activity. When the user enters the location at which the auction is conducted, the user may join the network. In one example, the user may not join the network until the user is within range of the auction item (or any other desired reference point).

Alternatively, the host device may transmit a message containing a promotion to any mobile device (102A, 102B, 102C) within a predetermined distance from a predetermined reference point. The predetermined reference point may be an auction item as described in the example above but may also be any other desired reference point. For example, the predetermined reference point may be the host device, any of the mobile devices or other location. When a device enters the area defined by the predetermined distance from the predetermined reference point, the host device may transmit the message containing the promotion (or any other desired correspondence) to the device. Also, the host device may track the location of devices in the network. When a device in the network moves to within a certain predetermined location at a predetermined time, the host device may transmit a message to the device. The message may contain, for example, a promotion, advertisement, offer, etc.

Each of the devices (mobile devices 102A, 102B, 102C, in this example) receives the auction announcement from the host device 101. The respective users of each of the devices determine if participation is desired. In the example illustrated, User A (of mobile device 102A) and User C (of Mobile device 102C) wish to participate in the auction. Hence, User A of Mobile device 102A transmits a message to the host device (402) to indicate the desire to participate in the auction. Likewise, User C of Mobile device 102C transmits a message to the host device (403) to indicate the desire to participate in the auction also. User B (of Mobile device 102B) does not wish to participate in the auction and does not affirmatively join the auction.

Figure 6:
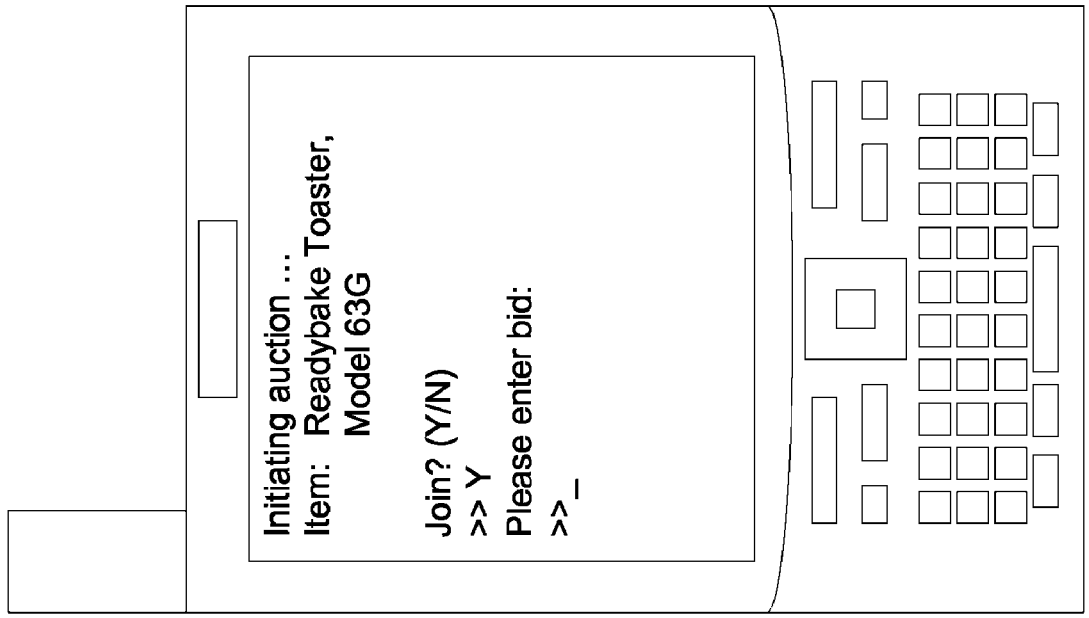
FIG. 6 illustrates the message from a host device requesting an input from the user for the bid.
Figure 5:
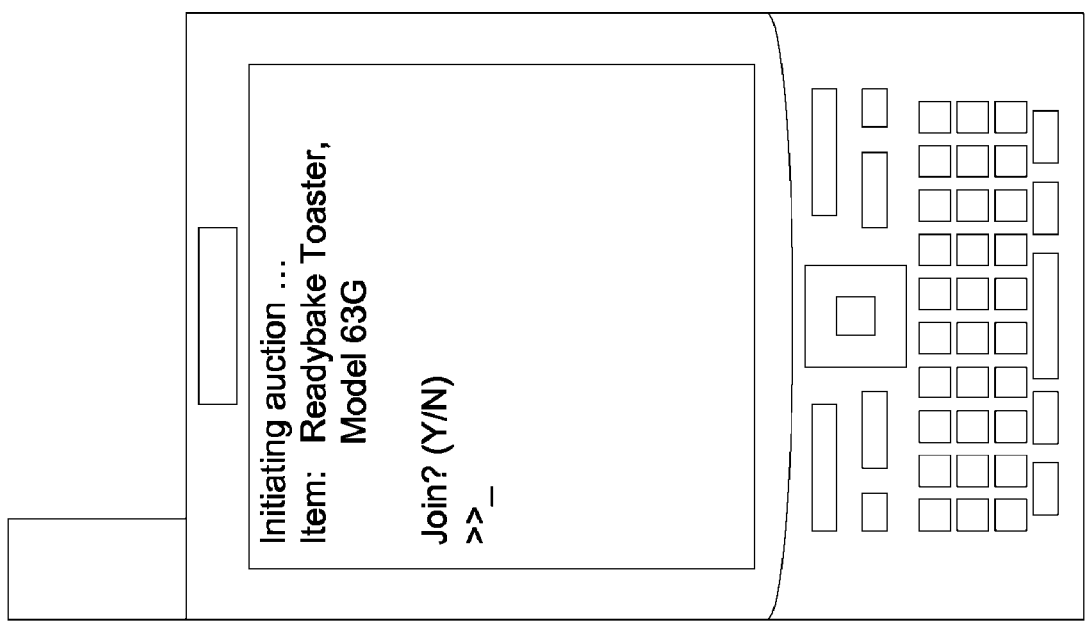
FIG. 5 illustrates an example of a handheld wireless device receiving a message from a host device indicating an auction.
Figure 7:
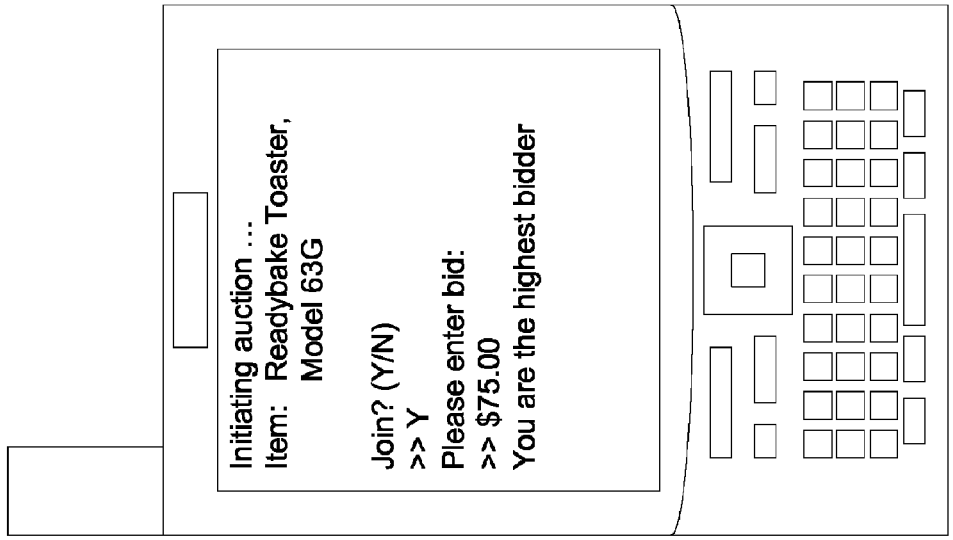
FIG. 7 illustrates a user transmitting a bid for an auction item.

After each of the participating devices (Mobile device 102A and Mobile device 102C) joins the auction, an ad hoc network is created among the participating devices (i.e., the devices federate into an ad hoc network—STEP 404, FIG. 4). FIG. 5 illustrates an example of a handheld wireless device receiving a message from a host device indicating an auction for a toaster (corresponding to step 401 of FIG. 4). The message includes an invitation to join the auction, if desired. In this example, the user of the handheld wireless device indicates the desire to participate in the auction as shown in FIG. 6 where the user has entered "Y(ES)". In response to receiving the affirmative response, the host device 101 may send a message to the user inquiring about the amount of a bid for the auction item. FIG. 6 illustrates the message from the host device 101 requesting an input from the user for the bid. In FIG. 7, the user transmits a bid for the auction item (STEP 405, FIG. 4).

Figure 9:
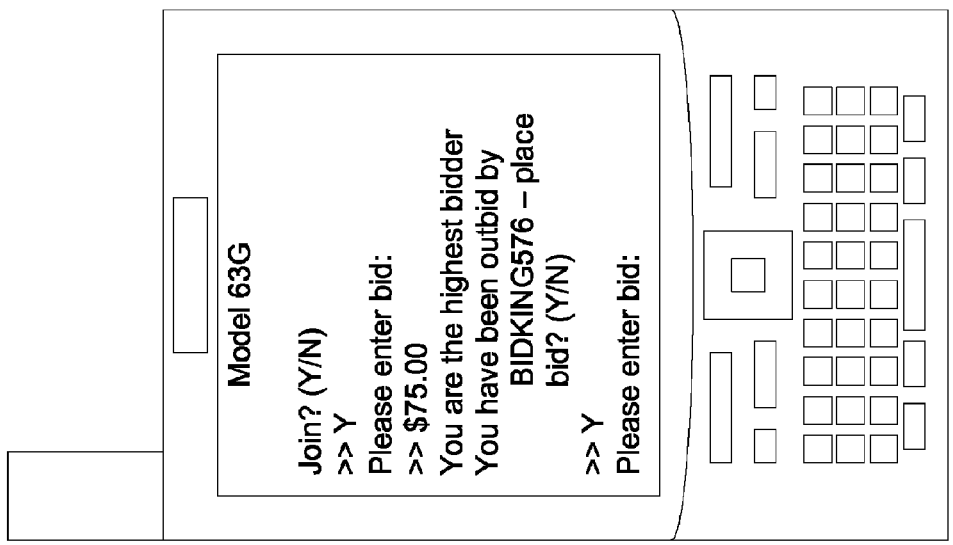
FIG. 9 illustrates a user inputting a new bid.
Figure 8:
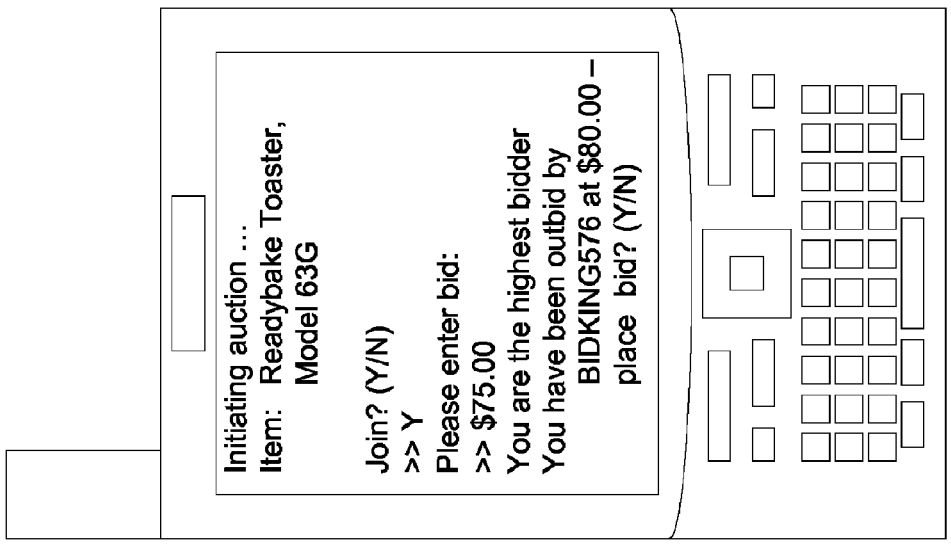
FIG. 8 illustrates a host device processing a bid received from a user.
Figure 10:
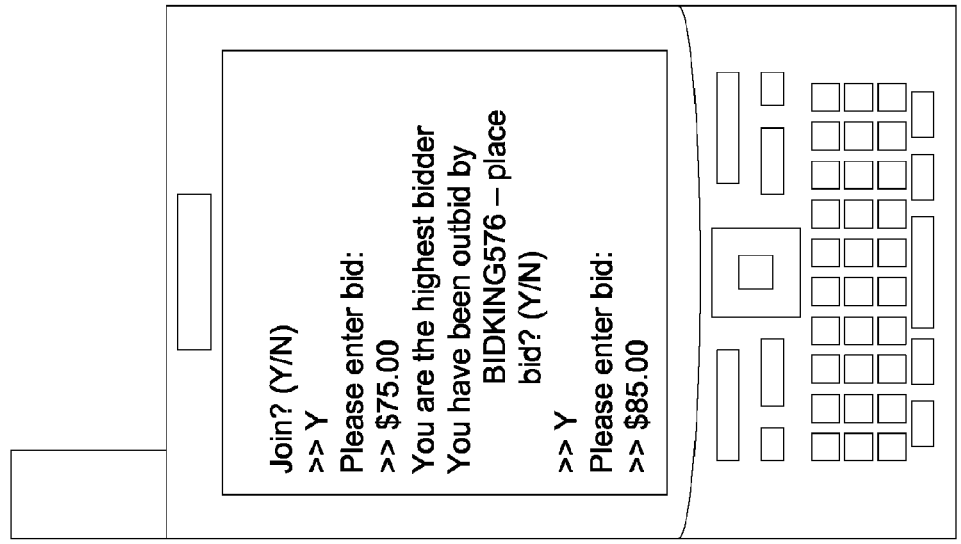
FIG. 10 illustrates entry of a new bid in an auction.
Figure 11:
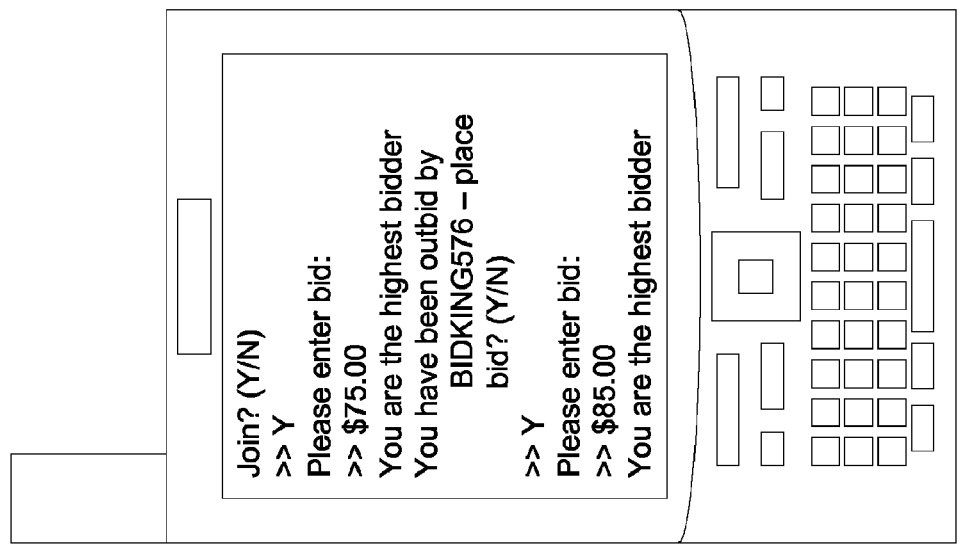
FIG. 11 illustrates indication of a highest bidder in the auction.
Figure 12:
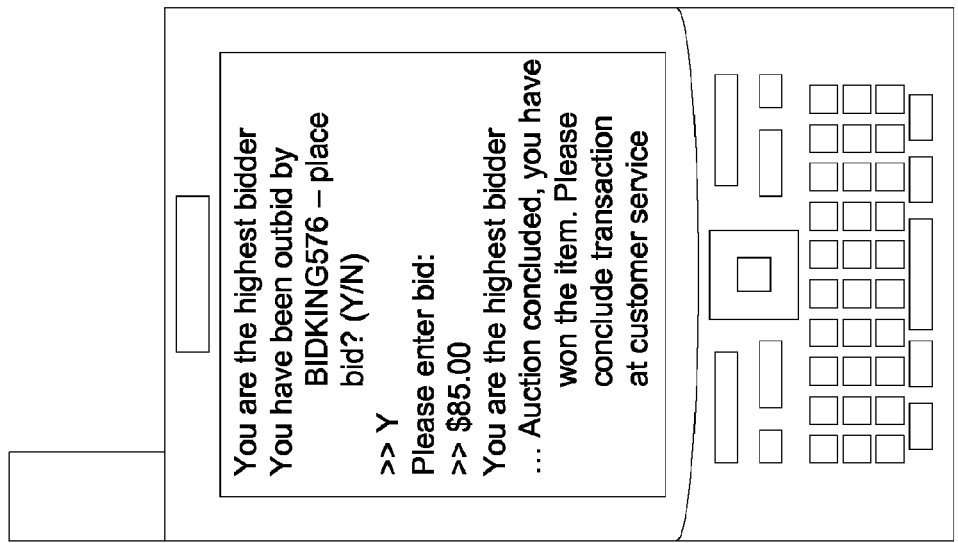
FIG. 12 informing the winner of the auction.

Another user may also bid on the auction item. As illustrated in FIG. 4, User C of Mobile Device 102C submits a bid (STEP 406) to the host device 101. The bid from User C is higher than the bid received from User A of Mobile Device 102A. Mobile devices 102A and 102C are federated in an ad hoc network for the auction such that User C's bid may also be displayed to User A of Mobile device 102A such that User A knows the bid received from User C. In another example (illustrated in FIG. 8), the host device 101 processes the bid received from User C and informs User A at Mobile device 102A. FIG. 8 and FIG. 9 also illustrate that User A of Mobile device 102A may enter a new bid (corresponding to STEP 407, FIG. 4). In this example, User A enters a new bid (FIG. 10) and becomes the highest bidder (FIG. 11). When the auction concludes, the highest bidder may purchase the auction item at the last price. In this case the end of the auction is announced (STEP 408, FIG. 4) and the winner of the auction is informed (FIG. 12). In this example, User A of Mobile device 102A may proceed to purchase the auction item.

In yet another example, devices may federate to make purchases in bulk. Items may be sold by merchants in large quantities at a lower per-item rate than purchases of the item in smaller quantity. Thus, purchasers of the item may save money by buying large quantities of the item. However, a purchaser may not need or want a large quantity of the item. Depending on the nature of the item, purchasing a large number of items may result in waste if the additional items are not used in a timely fashion. A purchaser or user may federate with other users to inform the other users of the purchase. The other users may join in the purchase such that each participating user may divide the items based on a respective paid amount. For example, if a first user wishes to buy 1000 eggs at a lower per-egg rate but fears that he/she would be unable to consume 1000 eggs prior to spoilage of at least some of the eggs, the user may federate with other users in an ad hoc network and may transmit a message to any of the other users announcing the opportunity to buy some of the eggs at lower prices. Assuming nine other users express interest via the network to participate in the purchase, the ten users (total number of users) may split the 1000 eggs (100 eggs each) and pay a prorated amount. Thus, a user may advertise a desire to split the purchase with any number of other federated users in the ad hoc network.

Figure 13:
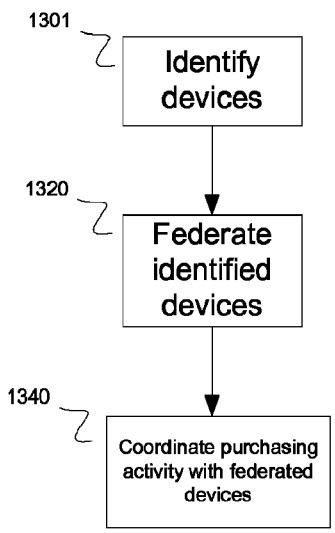
FIG. 13 is a flowchart illustrating an example of conducting a purchasing activity among federated devices.

FIG. 13 is a flowchart illustrating an example of conducting a purchasing activity among federated devices. The purchasing activity may be, for example, an auction or a bulk purchase among different users as described. In STEP 1301, devices are identified for participation in the purchasing activity (e.g., auction). The identified devices are federated into an ad hoc network (STEP 1320) and the purchasing activity is conducted among the federated devices (STEP 1340). In one example, the purchasing activity is coordinated among federated devices (STEP 1340) in which the federated devices have been authenticated. For example, a host device may receive identification information from the federated devices. The host device may verify the identity of the user of the federated device. This may be accomplished in a variety of ways including, for example, receiving a user ID and/or password or receiving answers to personal questions set up by the user. In addition, the host device may contain a memory for storing data pertaining to each of the users of the federated devices. The user information may include information on the each user's credit (e.g., credit history or credit worthiness). This information may be updated as desired. The memory may further include information pertaining to a user's prior purchasing habits. This may include the total number of times the user bid on an item, the total number of times the user won or lost a bid, the number of times the user paid or did not pay for an item that was won, the dates/times of each bid, or user comments from other users, to name a few. Any of this information may be stored in memory at the host device and may be used to determine the trustworthiness of the user. It may be decided to eliminate a user if the user is deemed as not trustworthy.

Figure 14:
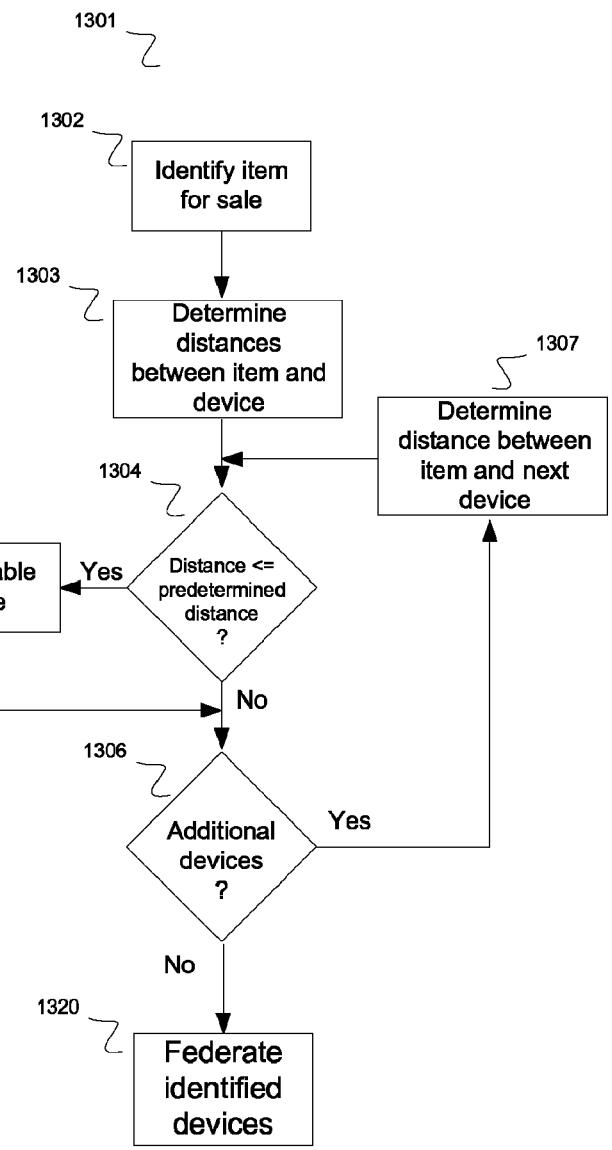
FIG. 14 is a flowchart illustrating an example of identifying devices for a purchasing activity.

FIG. 14 is a flowchart that illustrates one example of identifying devices in STEP 1301 of FIG. 13. In this example, an item is identified for sale (STEP 1302). This may include, for example, identifying an auction item for sale in an auction. Alternatively, the item for sale may be an item in bulk in which multiple users may split the item(s) and the cost of the item(s) among themselves. In STEP 1303, distances are measured between the item(s) for sale and each device within a predetermined range of the sale item. For example, all devices within a predetermined distance of the sale item may be identified as possible participants in an auction of the sale item. The distances may be determined in STEP 1303 by an initiating user or by a host device such as a server or hub. For example, the predetermined (threshold) distance may be selected as 500 feet such that all devices within 500 feet of the sale item(s) may be identified by a host device as possible participants. Alternatively, any predetermined (threshold) distance may be used such as, for example, 100 feet, 200 feet, 300 feet, 400 feet, 600 feet, 700 feet, 800 feet, 1000 feet, 1 mile, 5 miles, 10 miles, 100 miles, etc.

The host device or initiating user may determine all users within a distance range of the sale item where the distance range is greater than the desired predetermined distance. For example, the host device/initiating user may identify all devices capable of receiving a transmitted signal where at least some of the devices may be located greater than the predetermined distance from the sale item. Thus, in STEP 1304, the distance between the sale item and an identified device is compared to the predetermined distance. If the distance between the sale item and the identified device is less than or equal to the predetermined distance ("YES" branch of STEP 1304), then the identified device is further identified as a federatable device that may be federated into an ad hoc network for the purchasing activity (e.g. auction). On the other hand, if the identified device is out of range (located at a distance from the sale item that is greater than the predetermined distance), then the device is not identified as a federatable device ("NO" branch of STEP 1304).

In STEP 1306, the process is repeated for each of the identified devices. If an additional device is identified, then the distance between the sale item and the additional device is determined (STEP 1307) and compared to the predetermined (threshold) distance (STEP 1304). After all of the possible devices are identified as federatable or not federatable ("NO" branch of STEP 1306), the identified federatable devices may be federated into an ad hoc network for participation in the purchasing activity (STEP 1320).

Figures 15, 16:
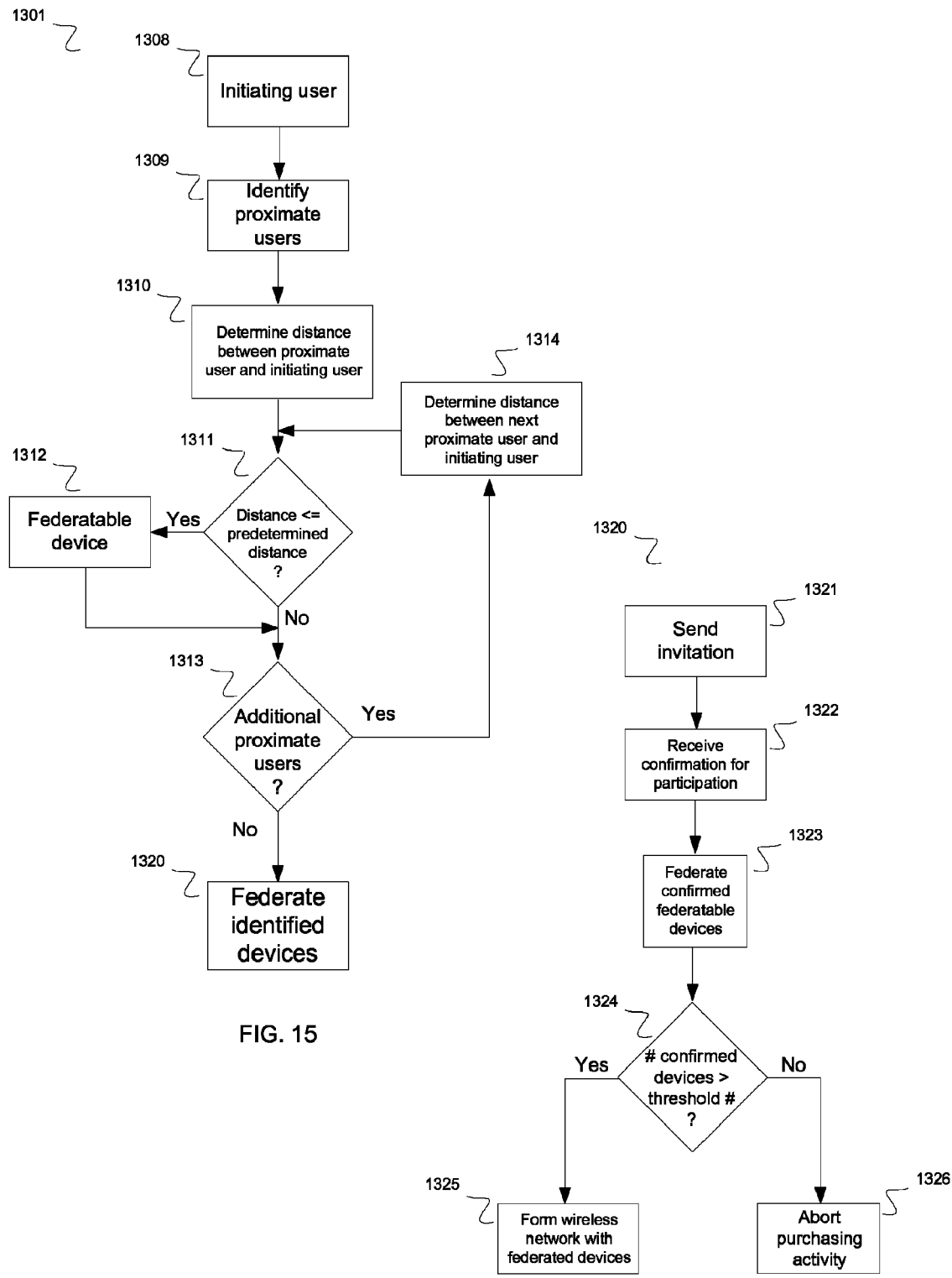
FIG. 15 is a flowchart illustrating another example of identifying devices for a purchasing activity.
FIG. 16 is a flowchart illustrating one example of federating devices.

FIG. 15 is a flowchart illustrating another example of identifying devices in STEP 1301 of FIG. 13. In this example, an initiating user initiates the purchasing activity (e.g., auction) in STEP 1308. The initiating user identifies users within the vicinity of the initiating user (STEP 1309) and may further determine the distance between each of the identified users (proximate users) and the initiating user (STEP 1310). Each of the determined distances may be compared to a predetermined (threshold) distance (STEP 1311). If a proximate device is within the predetermined (threshold) distance of the initiating user ("YES" branch of STEP 1311), then the proximate device may be further identified as a federatable device. Otherwise ("NO" branch of STEP 1311), the proximate device may not be identified as a federatable device for inclusion in the purchasing activity.

In STEP 1313, additional proximate users are examined ("YES" branch of STEP 1313) and the distance between each of the additional proximate users and the initiating user is determined (STEP 1314). Each additional proximate user within the predetermined (threshold) distance of the initiating user ("YES" branch of STEP 1311) may be identified as a federatable device. In STEP 1320, devices identified as federatable may be federated into an ad hoc network for participation in a purchasing activity (STEP 1320).

In STEP 1320 (FIGS. 13, 14, and 15), devices identified as federatable are federated into an ad hoc network through which the federated devices may exchange messages. For example, a host device or an initiating user may send or transmit a radio request to one or more devices to join a purchasing activity (e.g., auction). The transmitted request in turn causes federation of the one or more devices to form an ad hoc wireless network through which the one or more devices may communicate or exchange messages.

FIG. 16 is a flowchart illustrating one example of federating devices of STEP 1320. In this example, a radio request or invitation is transmitted to one or more federatable devices (STEP 1321). Each of the one or more federatable devices may receive a message from the transmitting device (e.g., host device or initiating user) announcing an auction or other purchasing activity. Alternatively, the invitation may be transmitted to devices that are outside a predetermined range of the auction. In this case, devices that are outside of the predetermined range of the auction may participate in the auction after entering to within the predetermined range of the auction. Each user of the one or more federatable devices may transmit a confirmation message to the transmitting device (STEP 1322) to indicate participation in the ad hoc network and purchasing activity. In STEP 1323, each of the confirmed devices may then form an ad hoc wireless network through which the confirmed devices may exchange messages or communicate. Additionally, in STEP 1324, the number of confirmed devices for participation in the purchasing activity is determined and compared to a predetermined threshold number. If there is an insufficient number of participating devices ("NO" branch of step 1324), then the purchasing activity is cancelled (STEP 1326). Otherwise, there is a sufficient number of participating devices ("YES" branch of step 1324) and the participating devices may federate to form a wireless network (STEP 1325). In one example, an auction is conducted among the confirmed devices in which the participants may bid on the item for sale, observe bids from other participants, be informed of the status of the auction and/or sale item, etc. The data may be transmitted via the ad hoc network among the participants.

In another example, devices may be identified as federatable devices in a network for an auction by various methods. As described above, devices within a predetermined distance of an auction item or within a predetermined distance of any desired reference point (e.g., location of an entity initiating an auction) may be identified and may be informed of an auction of an auction item. Alternatively, many other criteria may be used to identify devices for participation in the auction. For example, a device may be a mobile device that is in motion in a particular direction or at a particular speed. Based on the movement or the pattern of movement of the device, the device may be informed of the auction or may be invited to participate in the auction. In one example, the identified device may be moving in a particular trajectory or at a particular velocity such that participation in the auction would be deemed likely or that interest in the auction item may be likely. For example, based on the current path, direction or speed of the device, the host device may determine that the device may arrive at a certain point at a particular time or that the destination location may be associated with interest in the auction item. Additionally or alternatively, a decision to include a device in a federated network for the auction may be based on a determination of a likelihood of the presence of the device at a particular destination. This determination may be made many ways. For example, the determination may be based on historical behavior patterns of a user of the device, prior activity of the user, whether the user has been located at or passed the location in the past, etc.

Also, a schedule or calendar of users of devices may be stored or may be accessible by the host device or any entity initiating an auction. In this case, devices may be informed of the auction based on schedules of the users which may also include a determination of a likely location of the user at a particular time. This may also include a prior pattern of places that the user may frequent and/or the length of time a user may have spent at any location of interest. Thus, based on places that a user may have visited and/or a length of time a user may stay at the places, a correlation with the type of auction item may be determined. If a match is identified, such as a likelihood of interest in the auction item based on the destination locations and/or length of time spent at the locations, the device may be included in the auction.

In another example, prior activity or habits of a user or other characteristics of the device or user may be used to determine if a device corresponding to the user may be included in an auction or whether the device and user should be informed of the auction. For example, demographic information pertaining to the user may be stored and may be accessible by the entity initiating the auction. Based on the demographics, the user and device may be informed of the auction. As one example, the user of the device may be within a demographic group that is likely to be interested in the auction item. In this case, the user may be informed of the auction or may be invited to join the auction. Also, a device may be informed of an auction or invited to join an auction based on prior purchases, either at previous auctions or elsewhere, or interests or preferences of the user associated with the device. Based on such user information a determination may be made as to the likelihood of interest of the user in the auction item or a decision may be made for inclusion of the device in the auction.

There are many other method of determining participation of a device or user in an auction. For example, a particular time of day or day of the week may be determined to determine which users may be likely to participate in the auction. As an example to illustrate, a user may be identified as participating an a particular activity at a particular time of day or on a particular day of the week (e.g., grocery shopping). The activity may be associated with auction item or may indicate a potential interest in the auction item (e.g., the auction item may be a grocery-related item). The device may thus be informed of the auction.

A user's interests may be used to determine likelihood of interest in an auction item. This may include but is not limited to music the user listens to or enjoys, books that the user may enjoy, movies that the user enjoys, etc. Any personal characteristic or propensity of the user may be used in the determination. In addition, an auction profile of the user may be stored and accessed for determining interests or preferences of the user in auction. The auction profile may include, for example, interests of the user indicating items of interest to the user. Based on this information, the user may be invited to participate in a particular auction based on the nature of the auction item in the particular auction.

In addition, a user's attentional focus may be used to determine inclusion in an auction. For example, if a user is currently listening to media (e.g., listening to an MP3 player or watching a video) or if the person is engaged in a conversation (e.g., talking on the telephone), the user may be more or less likely to participate in the auction. A decision may be made to include the user and the corresponding device in the auction based on such activities. For example, the user who is engaged in a telephone conversation may be preoccupied and less likely to participate in the auction. However, a user may be listening to music on an MP3 player but may be likely to be interested in an auction if the auction item is related to the music being listened to.

In addition, information on the user may be shared. Alternatively, a privacy model may be enforced such that user information is not shared or selected portions of the information may be shared while other information may not be shared. User information may include, for example, user preferences, user interests, user destinations including time and day, location of the user, prior activity including purchasing or auction activity, historical data, demographic data, calendar and task list information, etc. Any part of the information may be shared or not shared based on the privacy model. Thus, privacy is maintained in this example.

It is understood that aspects of the present invention can take many forms and embodiments. The embodiments shown herein are intended to illustrate rather than to limit the invention, it being appreciated that variations may be made without departing from the spirit of the scope of the invention. Although illustrative embodiments of the invention have been shown and described, a wide range of modification, change and substitution is intended in the foregoing disclosure and in some instances some features of the present invention may be employed without a corresponding use of the other features. Accordingly, it is appropriate that the appended claims be construed broadly and in a manner consistent with the scope of the invention.

The invention claimed is:

1. A method for conducting an electronic auction, the method comprising:
   identifying an item for sale in the electronic auction;
   determining a distance between each of a plurality of devices and the item for sale, one of the plurality of devices being a host device that is conducting the electronic auction;
   identifying federatable devices of the plurality of devices wherein each federatable device is within a predetermined distance from the item for sale based on the distance determined;
   sending a radio request from the host device to the federatable devices causing the federatable devices to federate into an ad hoc wireless network through which the federated devices exchange messages; and
   conducting the electronic auction by exchanging messages between the federated devices via the ad hoc wireless network.

2. The method of claim 1, further comprising:
   determining a count of the federatable devices; and
   responsive to the determining, canceling the electronic auction.

3. The method of claim 1, wherein a device of the plurality of devices is also a federatable device based on a pattern of movement of the device.

4. The method of claim 1, wherein a device of the plurality of devices is also a federatable device based on a schedule of a user of the device.

5. The method of claim 1, further comprising identifying a device of the plurality of devices as federatable responsive to the device moving to be within the predetermined range.

6. The method of claim 1, further comprising, for each of the plurality of devices, determining a distance between the device and the host device.

7. The method of claim 1, wherein the item for sale is a bulk item for sale.

8. The method of claim 7, wherein the radio request includes a notification of the bulk item for sale.

9. The method of claim 7, wherein the step of conducting includes exchanging bulk purchase messages between the federated devices, the bulk purchase messages including an indication of the number of federated devices in the ad hoc wireless network.

10. The method of claim 9, wherein the bulk purchase messages further include an indication to split a bulk purchase corresponding to the bulk sale.

* * * * *